US012662195B2

(12) United States Patent (10) Patent No.: US 12,662,195 B2
Sawa et al. (45) Date of Patent: Jun. 23, 2026

(54) AUTOMOBILE PANEL

(71) Applicant: NIPPON STEEL CORPORATION, Tokyo (JP)

(72) Inventors: Yasunori Sawa, Tokyo (JP); Ryuichi Nishimura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 375 days.

(21) Appl. No.: 18/279,157

(22) PCT Filed: Jan. 21, 2022

(86) PCT No.: PCT/JP2022/002239
§ 371 (c)(1),
(2) Date: Aug. 28, 2023

(87) PCT Pub. No.: WO2022/209198
PCT Pub. Date: Oct. 6, 2022

(65) Prior Publication Data
US 2024/0124068 A1 Apr. 18, 2024

(30) Foreign Application Priority Data
Apr. 2, 2021 (JP) ................................. 2021-063389

(51) Int. Cl.
*B62D 25/10* (2006.01)
*B62D 25/12* (2006.01)

(52) U.S. Cl.
CPC ........... *B62D 25/105* (2013.01); *B62D 25/12* (2013.01)

(58) Field of Classification Search
CPC .............................. B62D 25/105; B62D 25/12
See application file for complete search history.

(56) References Cited

U.S. PATENT DOCUMENTS

| | | | |
|---|---|---|---|
| 8,991,902 B2 * | 3/2015 | Wisniewski | ......... B62D 25/105 296/193.11 |
| 9,889,890 B1 | 2/2018 | Manginen et al. | |
| 11,702,143 B2 * | 7/2023 | Nagy | .................... B60K 11/04 296/193.11 |
| 2009/0120704 A1 | 5/2009 | Thomas et al. | |
| 2010/0314907 A1 | 12/2010 | Iwano et al. | |

(Continued)

FOREIGN PATENT DOCUMENTS

DE 10 2007 053 171 A1 5/2009
EP 2 239 184 A1 10/2010
(Continued)

*Primary Examiner* — Taras P Bemko
(74) *Attorney, Agent, or Firm* — Birch, Stewart, Kolasch & Birch, LLP

(57) ABSTRACT

An automobile panel 1 has a sheet-shaped outer panel 2 and a sheet-shaped inner panel 3, and an interior member 30 arranged in a space S between the inner panel 3 and the outer panel 2. The interior member 30 is an elongated member that extends in a first direction D1 along the outer panel 2, and includes a first end 41 that is one end in the first direction D1, and a second end 42 that is another end. The first end 41 has a first connecting portion 45 which is connected to the inner panel 3. The interior member 30 has a second connecting portion 46 that is connected to the outer panel 2, at a position that is separated from the first end 41 along the first direction D1.

14 Claims, 11 Drawing Sheets

(56)        References Cited

U.S. PATENT DOCUMENTS

| | | | |
|---|---|---|---|
| 2016/0152280 A1* | 6/2016 | Inoue .................. | B62D 25/105 |
| | | | 296/193.11 |
| 2016/0251033 A1* | 9/2016 | Kolar, Jr. .............. | B62D 65/06 |
| | | | 296/193.11 |
| 2023/0014209 A1* | 1/2023 | Lopez .................. | B62D 25/12 |

FOREIGN PATENT DOCUMENTS

| | | | |
|---|---|---|---|
| JP | 9-216577 | A | 8/1997 |
| JP | 2005-212510 | A | 8/2005 |
| JP | 2007-76433 | A | 3/2007 |
| JP | 2008-100545 | A | 5/2008 |
| JP | 5684495 | B2 | 3/2015 |
| JP | 2015-171857 | A | 10/2015 |
| JP | 2016-132300 | A | 7/2016 |
| JP | 2020-32973 | A | 3/2020 |

* cited by examiner

Modification of arrangement of second connecting portions

First modification

First modification

Second modification

Modification of the second modification

Third modification

Modification of the third modification

Fourth modification

AUTOMOBILE PANEL

TECHNICAL FIELD

The present invention relates to an automobile panel.

BACKGROUND ART

Various kinds of panels such as automobile hoods are used as panels that constitute the outer appearance portions of automobiles (for example, see Patent Documents 1 and 2). Such panels usually have a configuration in which an inner panel that is a sheet and an outer panel that is a sheet are superposed, and a space is provided between the inner panel and the outer panel. There is a demand for further weight reductions to be achieved in such panels in order to increase energy saving performance.

LIST OF PRIOR ART DOCUMENTS

Patent Documents

Patent Document 1: JP5684495B
Patent Document 2: JP9-216577A

SUMMARY OF INVENTION

Technical Problem

When the thickness of a panel is made thin in order to achieve a reduction in weight, the surface rigidity, such as the panel rigidity, of the panel decreases. Note that, the panel rigidity corresponds to the feeling of elastic resistance or the sensation of deflection deformation when the outer panel is pressed with a hand. This characteristic is usually represented by the deflection when a load is applied, and the smaller that the deflection is when a constant load is applied, the higher the panel rigidity is. Further, the surface rigidity refers to the difficulty of deformation of the outer panel in a certain area range when the outer panel receives a load such as a vertical load from the outer surface of the outer panel.

Further, in an automobile panel such as an automobile hood, various functional components are arranged in a space between the inner panel and the outer panel, and in some cases there is little room to spare with respect to the space for arranging the components within such a space. In particular, an outer circumferential edge part of the inner panel and an outer circumferential edge part of the outer panel are joined to each other by hemming, and the space between the inner panel and the outer panel around these outer circumferential edge parts is small. Consequently, it is difficult to secure space in which a member that stiffens (reinforces) the outer panel between the inner panel and the outer panel is arranged. Furthermore, in the case of providing an interior member in order to increase the surface rigidity, preferably the interior member is joined to both the inner panel and the outer panel.

However, although Patent Document 1 discloses a reinforcing member that is joined to an outer panel, the reinforcing member is not joined to an inner panel. Further, although a reinforcing member illustrated in FIG. 5 of Patent Document 2 is joined to an inner panel and an outer panel, the reinforcing member is arranged in a wide space between the inner panel and the outer panel, and hence a large thickness is required. Therefore, Patent Documents 1 and 2 neither disclose nor suggest a reinforcing member which can be installed even in a narrow space between an inner panel and an outer panel and which has a sufficient stiffening effect.

An objective of the present invention is, in an automobile panel, to secure sufficient surface rigidity in an outer panel even at a location where a space between an inner panel and the outer panel is narrow, while also achieving a reduction in weight.

Solution to Problem

The gist of the present invention is an automobile panel described hereunder.

(1) An automobile panel including:
   a sheet-shaped outer panel located on an outer side of a vehicle, and
   an inner panel that is joined to the outer panel and is arranged on an inner side of the vehicle,
   further including:
   an interior member arranged in a space between the inner panel and the outer panel,
   wherein:
   the interior member is an elongated member extending in a first direction along the outer panel, and includes a first end that is one end in the first direction and a second end that is another end in the first direction;
   the first end has a first connecting portion that is connected to the inner panel; and
   the interior member has, at a position that is separated from the first end along the first direction, a second connecting portion that is connected to the outer panel.

(2) The automobile panel according to the above (1), wherein the interior member is a sheet-shaped member.

(3) The automobile panel according to the above (2), wherein the interior member includes a planar base plate in which the first end and the second end are formed.

(4) The automobile panel according to the above (2), wherein:
   the interior member includes a base plate;
   the base plate includes a first portion including the first end, a rising portion that rises from the first portion toward a side of the outer panel, and a second portion that extends from the rising portion and whose position in a sheet thickness direction of the outer panel is different from a position of the first portion; and
   the second connecting portion is arranged in the second portion.

(5) The automobile panel according to any one of the above (2) to the above (4), wherein the interior member has a bead that is formed along the first direction.

(6) The automobile panel according to any one of the above (1) to the above (5), further including:
   an other member formed separately from the interior member and arranged in the space between the inner panel and the outer panel,
   wherein:
   the interior member is arranged in a state in which a portion which is advanced from the first end toward a side of the second end overlaps with the other member as viewed in the sheet thickness direction of the outer panel.

(7) The automobile panel according to any one of the above (1) to the above (6), wherein:
   the inner panel further includes a protruding portion which protrudes further inward than a region that is joined to the outer panel, and separates from the outer panel, and the interior member is arranged in a state in which the portion which is advanced from the first end toward the side of the second end overlaps with the protruding portion as viewed in the sheet thickness direction of the outer panel.

(8) The automobile panel according to any one of the above (1) to the above (7), wherein:

an outer circumferential edge part of the outer panel sandwiches the inner panel to be joined to the inner panel, and the first direction intersects with a direction along the outer circumferential edge part of the outer panel.

(9) The automobile panel according to any one of the above (1) to the above (8), wherein:

the automobile panel is an automobile hood, and a plurality of the interior members are aligned at a rear part of the automobile hood.

(10) The automobile panel according to the above (9), wherein:

the first end of each of the plurality of interior members is connected to a common connecting member.

(11) The automobile panel according to the above (10), wherein:

the interior member in which a directional component in the first direction includes a directional component in a vehicle cross direction is connected to both ends of the connecting member.

(12) The automobile panel according to any one of the above (1) to the above (11), wherein:

a plurality of the interior members that have different bending rigidities are provided, and a plurality of the interior members that have different bending rigidities are arranged according to a strength of the vehicle at locations advanced by a predetermined amount toward an inner side of the vehicle from the outer panel.

(13) The automobile panel according to the above (12), wherein:

a first interior member whose bending rigidity is relatively high and a second interior member whose bending rigidity is relatively low are provided as the plurality of the interior members that have different bending rigidities, the first interior member is arranged so that, as viewed in the sheet thickness direction of the outer panel, the first interior member overlaps with a high strength region where a strength of the vehicle is relatively high at the location advanced by the predetermined amount toward the inner side of the vehicle from the outer panel, and the second interior member is arranged so that, as viewed in the sheet thickness direction of the outer panel, the second interior member overlaps with a low strength region where the strength of the vehicle is relatively low at the location advanced by the predetermined amount toward the inner side of the vehicle from the outer panel.

(14) The automobile panel according to any one of the above (1) to the above (13), wherein:

the inner panel includes: a flange which is arranged on an inner side of the inner panel with respect to an outer circumferential edge part of the inner panel, and which is arranged adjacent to the outer panel; an inclined wall that extends from the flange so as to separate from the outer panel; and a bottom portion that is continuous with the inclined wall and is separated from the flange, and the first connecting portion is connected to the flange.

Advantageous Effects of Invention

According to the present invention, in an automobile panel, sufficient surface rigidity can be secured in an outer panel even at a location where a space between an inner panel and the outer panel is narrow, while also achieving a reduction in weight.

DESCRIPTION OF EMBODIMENT

Hereunder, an embodiment of the present invention is described while referring to the accompanying drawings. In the present embodiment, a case in which an automobile hood is taken as one example of an automobile panel is described. Note that, the automobile panel of the present invention is not limited to an automobile hood, and can be applied to an automobile outer skin panel that includes an inner panel and an outer panel, for example, an outer skin panel of an automobile body such as a door panel, a roof panel, a fender panel, or a rear gate panel.

Figure 1:
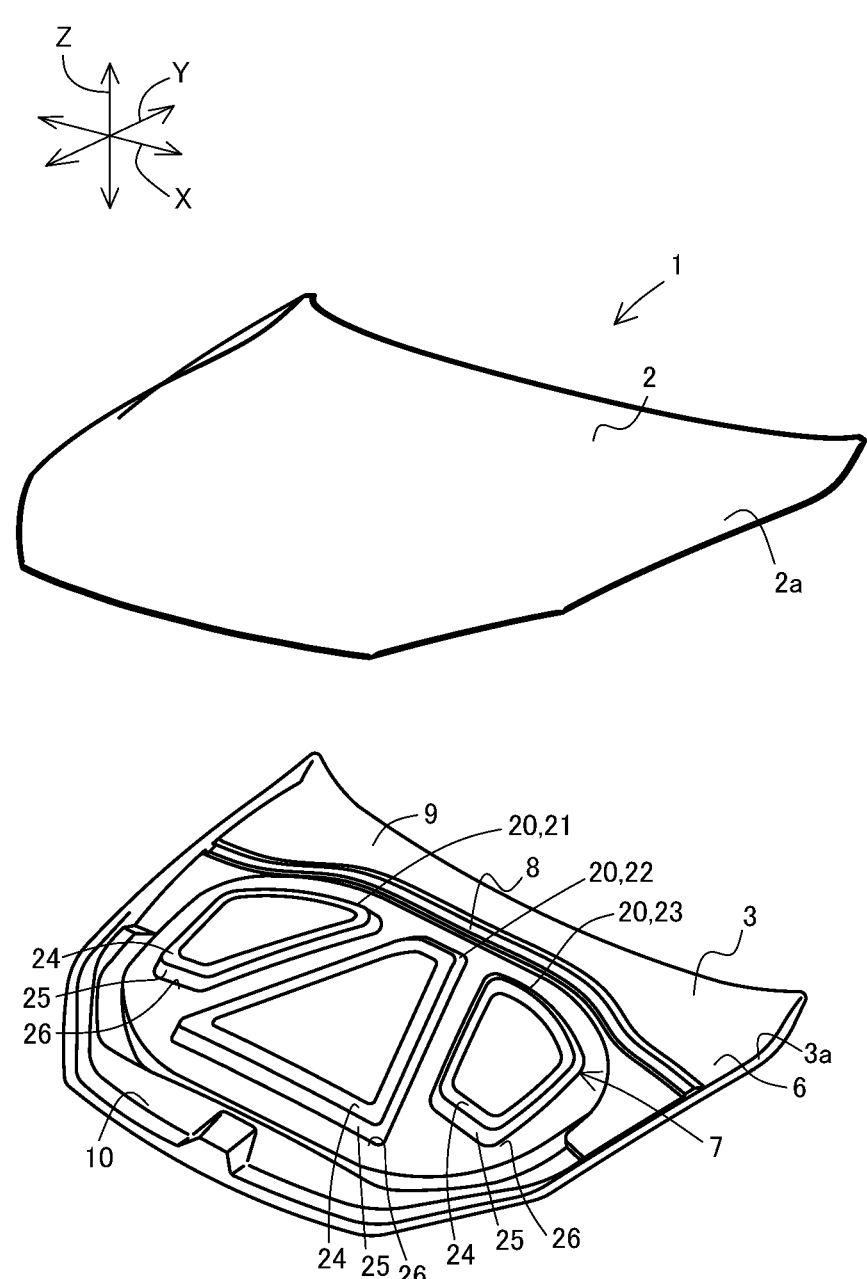
FIG. 1 is a schematic exploded perspective view illustrating an outer panel and an inner panel of an automobile panel according to one embodiment of the present invention.
Figure 2:
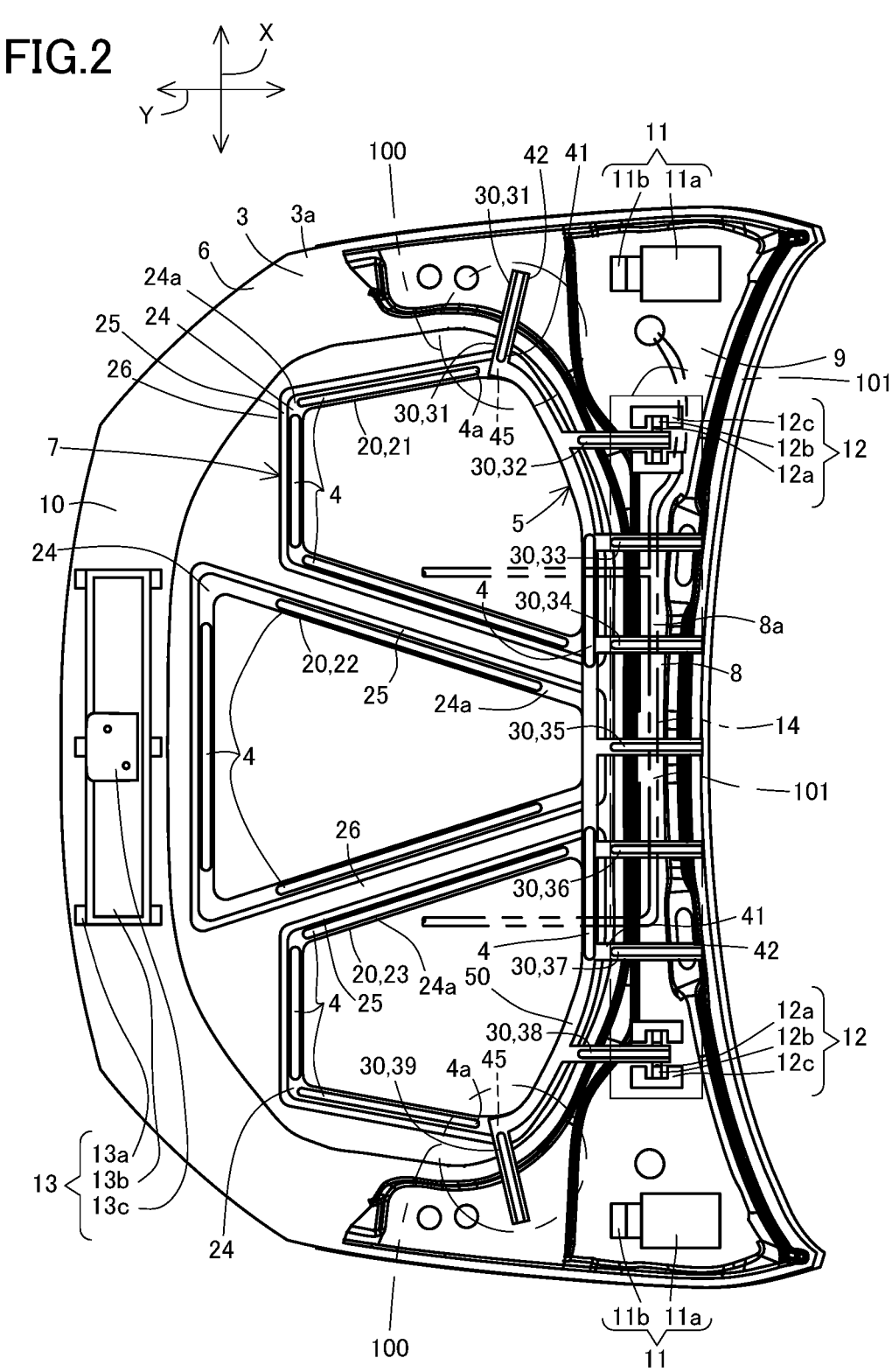
FIG. 2 is a plan view illustrating the inner panel of the automobile panel and members installed on the inner panel.
Figure 3:
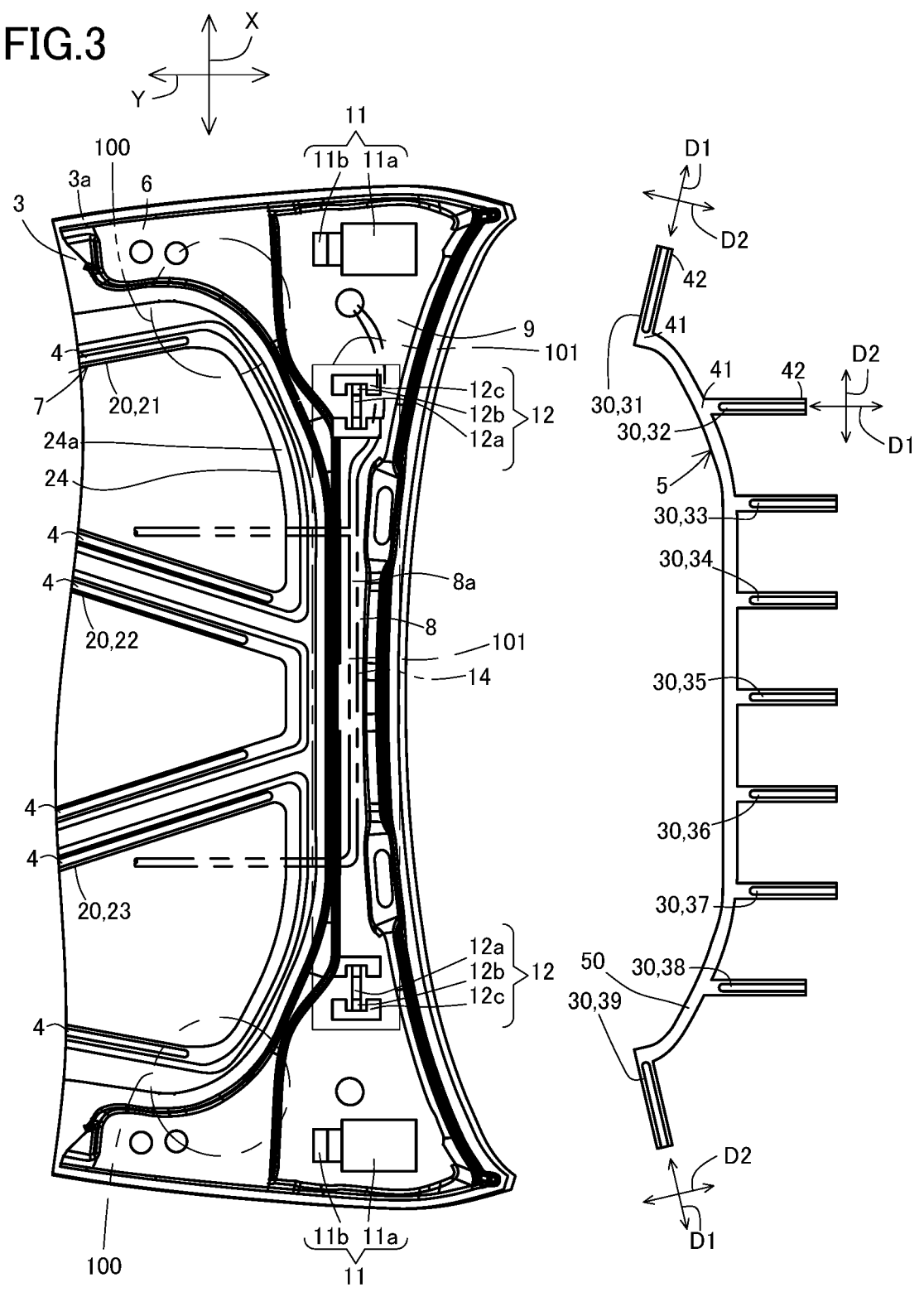
FIG. 3 is a plan view illustrating a state in which the inner panel and an interior member unit that are illustrated in FIG. 2 are separated.
Figure 4:
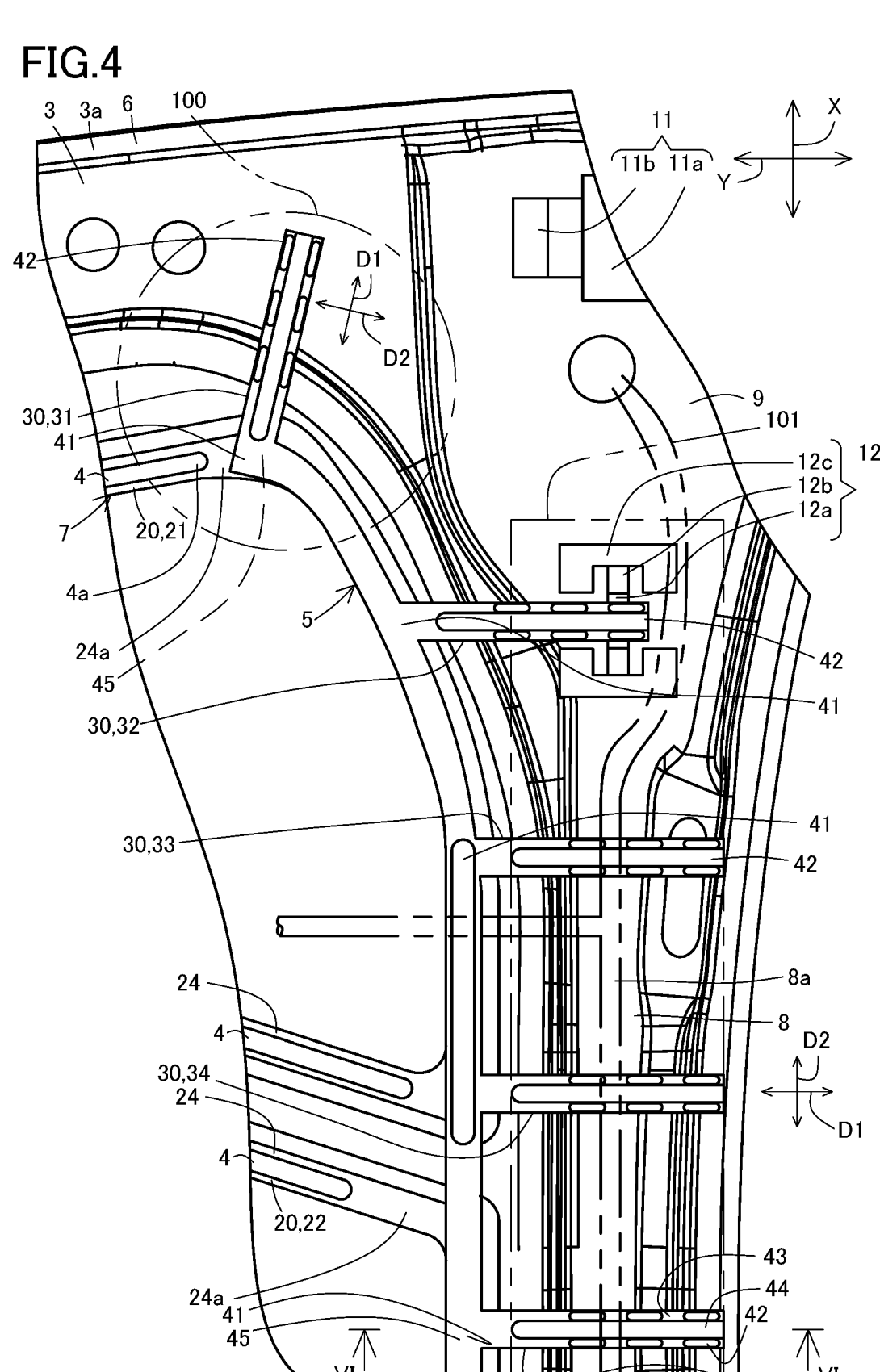
FIG. 4 is a view illustrating one part of FIG. 2 in an enlarged manner.
Figure 5:
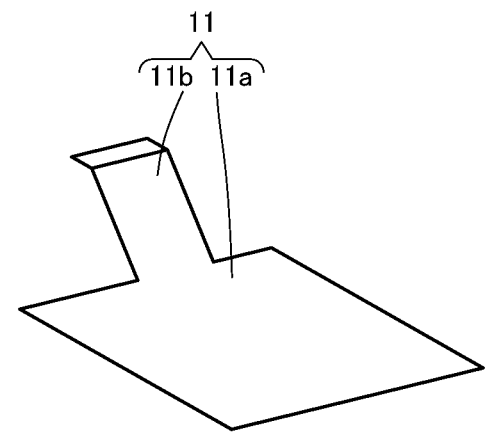
FIG. 5 is a schematic perspective view illustrating a first other member and a second other member.
Figure 5:
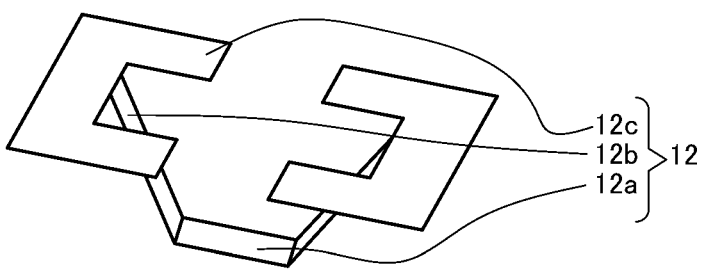
Figure 6:
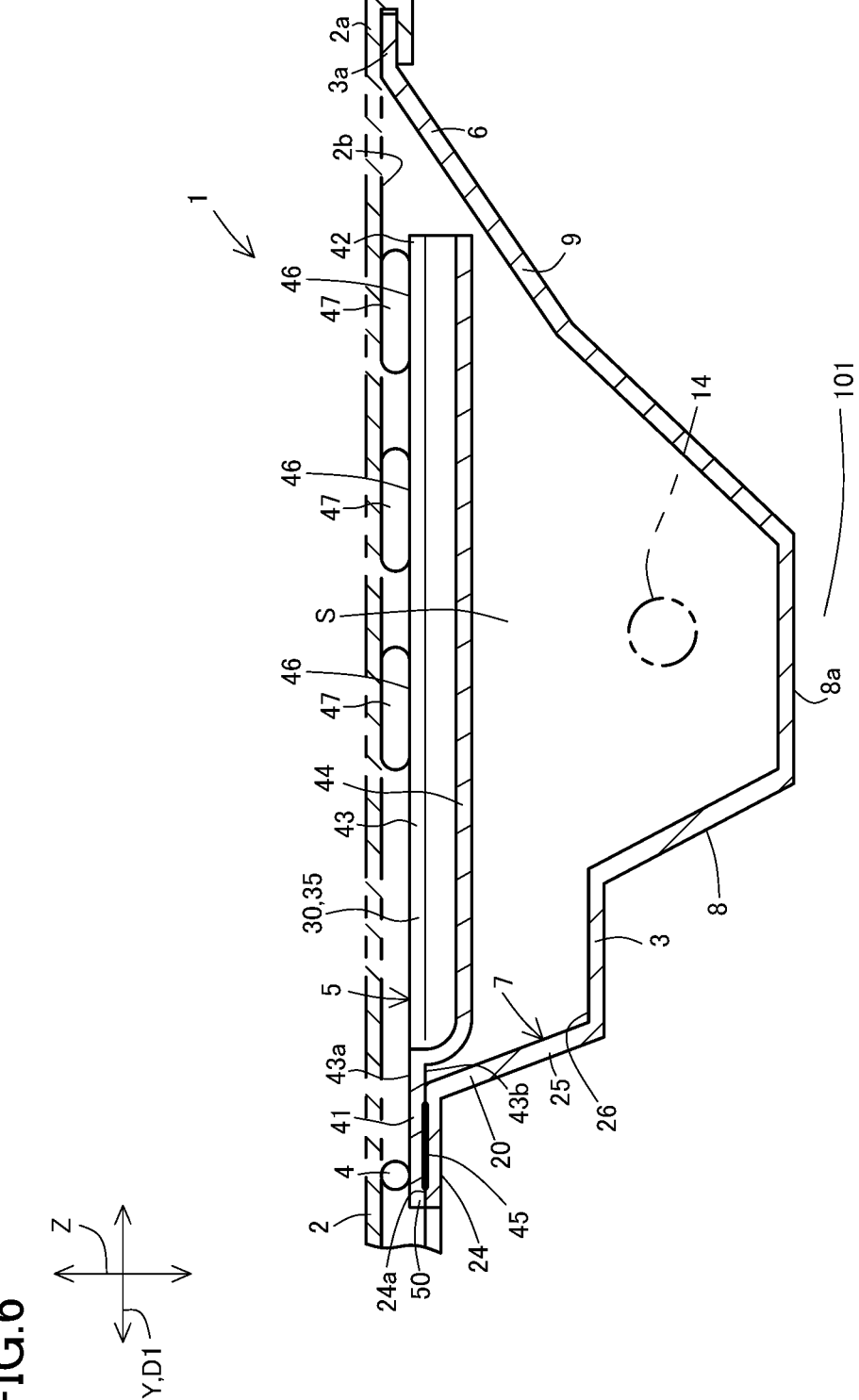
FIG. 6 is a schematic cross-sectional view along a line VI-VI in FIG. 4, in which the outer panel is illustrated, and illustration of a rear side of the cross section is omitted.
Figure 7A:
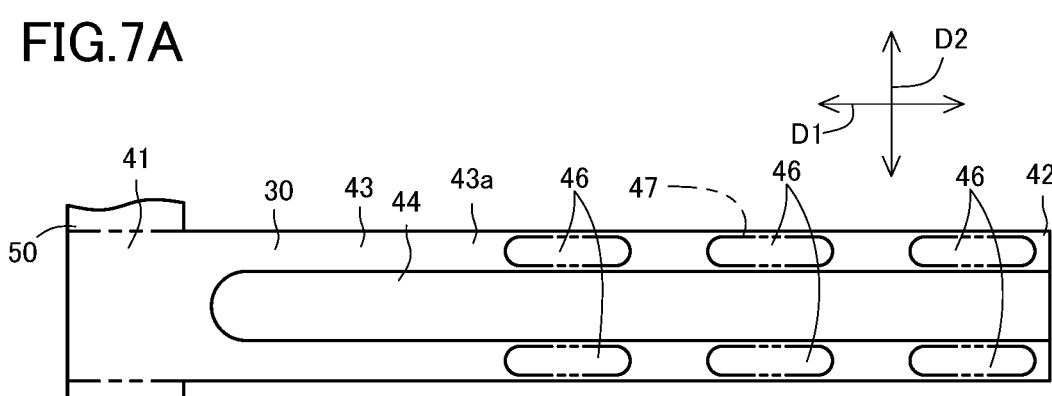
FIG. 7A is a view illustrating one interior member as seen in a sheet thickness direction of the outer panel.
Figure 7B:
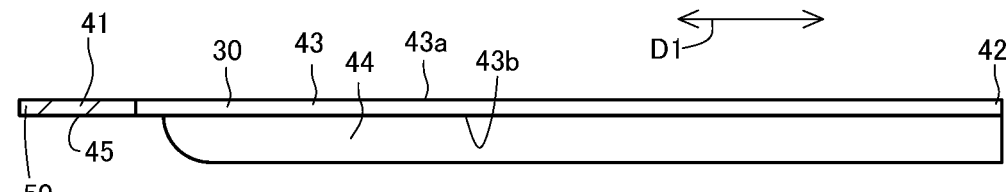
FIG. 7B is a view illustrating one interior member as seen from a short-length direction of the interior member.
Figure 7C:
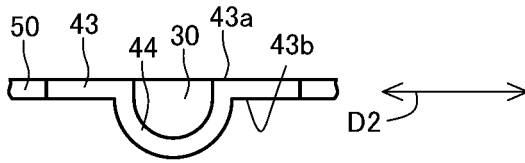
FIG. 7C is a rear side view of one interior member.

FIG. 1 is a schematic exploded perspective view illustrating an outer panel 2 and an inner panel 3 of an automobile panel 1 according to one embodiment of the present invention. FIG. 2 is a plan view illustrating the inner panel 3 of the automobile panel 1 and members installed on the inner panel 3. FIG. 3 is a plan view illustrating a state in which the inner panel 3 and an interior member unit 5 illustrated in FIG. 2 are separated. FIG. 4 is a view illustrating one part of FIG. 2 in an enlarged manner. FIG. 5 is a schematic perspective view illustrating a first other member 11 and a second other member 12. FIG. 6 is a schematic cross-sectional view along a line VI-VI in FIG. 4, in which the outer panel 2 is illustrated, and illustration of a rear side of the cross section is omitted. FIG. 7A is a view illustrating one interior member 30 as seen in a sheet thickness direction of the outer panel 2, FIG. 7B is a view illustrating one interior member 30 from a short-length direction D2 of the interior member 30, and FIG. 7C is a rear side view of one interior member 30. Hereinafter, unless otherwise specified, the embodiment will be described with reference to FIG. 1 to FIG. 7C as appropriate.

The automobile panel 1 is an automobile front hood that is provided at the front part of an automobile, and is also called a "bonnet". In the present embodiment, an automobile that includes the automobile panel 1 is disclosed. An automobile in which the automobile panel 1 is provided is, for example, a passenger vehicle. A sedan-type passenger vehicle, a coupe-type passenger vehicle, a hatchback-type passenger vehicle, a minivan-type passenger vehicle, an SUV (sport utility vehicle) type passenger vehicle and the like can be mentioned as examples of the passenger vehicle.

Note that, in the present description, the terms "front", "rear", "left", "right", and "upper" and "lower" are used taking a time when the automobile panel 1 is mounted to an automobile (vehicle) and the automobile panel 1 is closed as the basis. The term "front" refers to a direction in which the automobile advances. The term "rear" refers to a direction in which the automobile reverses. The term "right" refers to a turning direction of the automobile when the automobile which is advancing turns to the right. The term "left" refers to a turning direction of the automobile when the automobile which is advancing turns to the left. Further, in the present embodiment, a vehicle cross direction of the automobile to which the automobile panel 1 is mounted is referred to as a "cross direction X". Further, a vehicle length direction of the automobile to which the automobile panel 1 is mounted is referred to as a "longitudinal direction Y". Furthermore, a vehicle height direction of the automobile to which the automobile panel 1 is mounted is referred to as a "height direction Z".

The automobile panel 1 has: the sheet-shaped outer panel 2 which is located on the outer side of the vehicle; the inner panel 3 which is joined to the outer panel 2 and which is arranged on the inner side of the vehicle; a joint 4 that joins the outer panel 2 and the inner panel 3; the interior member unit 5 including a plurality of interior members 30; and the first other members 11 and 11, the second other members 12 and 12, a third other member 13, and a fourth other member 14 which are formed as separate members from the interior member unit 5.

The interior member unit 5, the first other members 11 and 11, the second other members 12 and 12, the third other member 13, and the fourth other member 14 are arranged in a space S between the inner panel 3 and the outer panel 2.

The outer panel 2 is a portion that constitutes a part of the outer surface of the automobile. The outer panel 2 is formed of, for example, a metal material such as a mild steel sheet or a high-tensile strength steel sheet. Examples of the high-tensile strength steel sheet that can be mentioned include steel sheets having a tensile strength of 340 MPa or more, for example, a steel sheet having a tensile strength of 590 MPa or more. The outer panel 2 is formed, for example, by subjecting a single steel sheet to press working or the like. A sheet thickness of the outer panel 2 (thickness of the steel sheet) is set to 0.6 mm or less, preferably is set to 0.5 mm or less, and more preferably is set to 0.4 mm or less. The sheet thickness of the outer panel 2 is, for example, 0.30 to 0.45 mm. The thinner the sheet thickness of the outer panel 2 is made in this way, the lighter the automobile panel 1 can be made.

Note that, in a case where the outer panel 2 is made of an aluminum alloy, the sheet thickness of the outer panel 2 is, for example, 0.5 to 0.8 mm.

There are no particular restrictions with regard to the shape of the outer panel 2. An outer circumferential edge part 2a of the outer panel 2 is joined to the inner panel 3 by sandwiching an outer circumferential edge part 3a of the inner panel 3. More specifically, the outer circumferential edge part 2a of the outer panel 2 includes a portion folded backwards by hemming, and the outer circumferential edge part 2a firmly sandwiches and is thereby joined to the outer circumferential edge part 3a of the inner panel 3, and by this means the respective outer circumferential edge parts 2a and 3a of the outer panel 2 and the inner panel 3 are joined to each other. Note that, the width of each of the outer circumferential edge parts 2a and 3a is approximately several millimeters, and these portions 2a and 3a are formed over the entire circumference of the panels 2 and 3.

The inner panel 3 reinforces the outer panel 2 by being joined to an undersurface 2b of the outer panel 2. By this means, the inner panel 3 increases the surface rigidity such as the panel rigidity of the outer panel 2.

The panel rigidity corresponds to a feeling of elastic resistance or a sensation of deflection deformation when the outer panel 2 is pressed with a hand. This characteristic is usually represented by the deflection when a load is applied, and the smaller the deflection is when a constant load is applied, the higher the panel rigidity is. Further, the surface rigidity refers to the difficulty of deformation of the outer panel in a certain area range when the outer panel 2 receives a load such as a vertical load from the outer surface of the outer panel 2.

The inner panel 3 is formed, for example, of a metal material such as a steel sheet. The inner panel 3 is formed, for example, by subjecting a single steel sheet to press working. The inner panel 3 may be an integrally formed product, or may be formed by joining a plurality of members together. In the present embodiment, the inner panel 3 is an integrally formed product. The sheet thickness of the inner panel 3 (thickness of the steel sheet) is preferably 0.3 mm to 0.6 mm. The sheet thickness of the inner panel 3 may be less than the sheet thickness of the outer panel 2, may be the same as the sheet thickness of the outer panel 2, or may be greater than the sheet thickness of the outer panel 2.

Note that, in a case where the inner panel 3 is made of an aluminum alloy, the sheet thickness of the inner panel 3 is, for example, 0.5 to 1.0 mm.

The inner panel 3 has the aforementioned outer circumferential edge part 3a, an outer circumferential portion 6 which is arranged on the inner side of the outer circumferential edge part 3a as viewed in the sheet thickness direction of the outer panel 2 (in the present embodiment, when viewed in the height direction Z), and an overhanging structure 7 that is surrounded by the outer circumferential portion 6.

Note that, in the present embodiment, the phrase "viewed in the sheet thickness direction of the outer panel 2" is also abbreviated to simply "viewed in the sheet thickness direction".

When the automobile panel 1 closes the engine room, one part of the outer circumferential edge part 3a and the outer circumferential portion 6 of the inner panel 3 is received by the automobile body (not illustrated) together with the outer circumferential edge part 2a of the outer panel 2. By this means, a load that acts on the outer panel 2 is received by the automobile body (not illustrated) through the inner panel 3.

The outer circumferential portion 6 is a three-dimensionally shaped portion formed in the inner panel 3. In the present embodiment, the outer circumferential portion 6 is formed over the entire area in a circumferential direction of the outer circumferential edge part 3a. Note that, the outer circumferential portion 6 may be formed only at one part in the circumferential direction of the outer circumferential portion 6 of the inner panel 3, and in such a case the outer circumferential edge part 3a and the overhanging structure 7 are directly connected.

The outer circumferential portion 6 includes a portion with a shape that rises and falls in the height direction Z as the position thereof moves in a horizontal direction over the inner panel 3. The specific shape of the outer circumferential portion 6 is not limited as long as the outer circumferential portion 6 has a shape that suppresses deflection deformation of the outer circumferential portion 6 in a downward direction when the outer circumferential portion 6 of the inner panel 3 receives a load which deflects the outer circumferential portion 6 downward due to the overhanging structure 7 of the inner panel 3 being lifted up by a human hand or the like.

In the present embodiment, the outer circumferential portion 6 has a protruding portion 8, a narrow portion 9 arranged around the protruding portion 8, and a front portion 10 arranged frontward of the narrow portion 9.

The protruding portion 8 protrudes toward the inner side of the vehicle (lower side) with respect to the outer circumferential edge part 3a that is joined to the outer panel 2 as viewed from a direction orthogonal to the sheet thickness direction (height direction Z) of the outer panel 2, and thereby separates from the outer panel 2.

In the present embodiment, the protruding portion 8 is formed at an intermediate portion in the cross direction X that is at a location that is advanced to the rearward side in the longitudinal direction Y from the overhanging structure 7. The intermediate portion of the protruding portion 8 in the cross direction X advances downward (toward the inner side of the vehicle) as it advances rearward from the overhanging structure 7, and thereafter advances along the longitudinal direction Y, and then advances upward (toward the outer side of the vehicle) to be continuous with the narrow portion 9. A clearance between a bottom portion 8a of the protruding portion 8 and the outer panel 2 is greater than a clearance between a bottom portion 26, described later, of the overhanging structure 7 and the outer panel 2. The fourth other member 14 is arranged between the bottom portion 8a of the protruding portion 8 and the outer panel 2.

In the present embodiment, the fourth other member 14 is, for example, a cable, and is a cable through which washer fluid for washing the windshield (not illustrated) of the automobile passes. In the present embodiment, the fourth other member 14 is a hollow cable formed of a flexible member such as rubber. The fourth other member 14 extends, for example, in the cross direction X above the protruding portion 8, and is attached to the inner panel 3 by a not-illustrated hanger or the like.

In the present embodiment the narrow portion 9 is formed around the protruding portion 8 in the outer circumferential portion 6. In the present embodiment, in the outer circumferential portion 6, the narrow portion 9 is arranged rearward of and on both sides in the cross direction X of the protruding portion 8, and the protruding portion 8 is surrounded by the narrow portion 9 as viewed in the sheet thickness direction. The narrow portion 9 is arranged up to both ends in the cross direction X at the rear part of the automobile panel 1. The narrow portion 9 is also arranged above a suspension tower 100 to be described later. The distance to the outer panel 2 along the height direction Z is less than the distance along the height direction Z between the bottom portion 8a of the protruding portion 8 and the outer panel 2. The portion that is frontward of the narrow portion 9 in the outer circumferential portion 6 is the front portion 10. The front portion 10 is, for example, a portion that is to the front relative to the suspension tower 100 in the sheet thickness direction in the outer circumferential portion 6.

The overhanging structure 7 has a three-dimensional structure which is provided in order to receive a load acting on an upper face of the outer panel 2. Although in the present embodiment the overhanging structure 7 is formed symmetrically in the cross direction X, the overhanging structure 7 may be asymmetrical in the cross direction X. The overhanging structure 7 has a plurality of units 20 (21 to 23). Note that, the units 21 to 23 are referred to generically as "units 20". As viewed in the sheet thickness direction, each unit 20 is arranged on the inner side of the inner panel 3 relative to the outer circumferential edge part 3a of the inner panel 3.

Each unit 20 is formed in an annular shape as viewed in the sheet thickness direction. In the present embodiment, three units 21 to 23 that are arranged in the cross direction X are provided. The units 21 and 23 on both end sides in the cross direction X are substantially trapezoidal as viewed in the sheet thickness direction. The unit 22 at the center in the cross direction X has a substantially triangular shape as viewed in the sheet thickness direction.

Each unit 20 has an annular flange 24, an annular inclined wall 25 continuous with the flange 24 and extending from the flange 24 so as to separate from the outer panel 2, and the bottom portion 26 which is continuous with the inclined wall 25 and is separated from the flange 24.

In the present embodiment, the flanges 24 and the inclined walls 25 in the units 21 and 23 on both sides on the left and right are substantially trapezoidal as viewed in the sheet thickness direction, and the flange 24 and the inclined wall 25 in the central unit 22 are substantially triangular as viewed in the sheet thickness direction.

Each flange 24 is adjacent to the outer panel 2 and is a portion arranged closest to the outer panel 2 in each of the units 21 to 23. In the present embodiment, in each of the units 21 to 23, the joint 4 is arranged on an upper face 24a of at least a part of the flange 24, and the inner panel 3 is joined to the outer panel 2 through the joint 4.

In the present embodiment, the joint 4 is an adhesive. A mastic sealer (mastic adhesive) can be exemplified as the adhesive. A resin-based adhesive can be exemplified as the mastic sealer. The adhesive may have a property of being cured at normal temperature (for example, 20 degrees Celsius), or may have a property of being cured by undergoing a heating process or a drying process.

The joint 4 is provided on the upper face 24a of the flange 24 of each unit 20. The joint 4 may be provided over the entire area in the circumferential direction of the upper face 24a of each flange 24, or may be provided intermittently in the circumferential direction. The joint 4 joins the flange 24 in which the relevant joint 4 is provided and the undersurface 2b of the outer panel 2.

A corresponding inclined wall 25 extends downward from each flange 24. That is, the flange 24 is continuous with the upper end of the inclined wall 25. A bottom portion 26 is continuous with the lower end of the inclined wall 25. The bottom portions 26 of the respective units 21 to 23 are continuous with each other.

Note that, although in the present embodiment a form in which the flange 24 of the respective units 21 to 23 is an annular shape is described as an example, this need not be the case. For example, a configuration may be adopted in which the flange 24 of the respective units 21 to 23 is not an annular shape as viewed in the sheet thickness direction, and is instead arranged intermittently along the circumferential direction of the units 21 to 23.

The first other members 11 and 11, the second other members 12 and 12, and the third other member 13 are arranged around the aforementioned overhanging structure 7.

The first other members 11 and 11 are, for example, provided in a pair at two ends in the cross direction X of the inner panel 3 at a rear end of the outer circumferential portion 6, and connect the inner panel 3 and the outer panel 2. In the present embodiment, the pair of first other members 11 and 11 are formed in a symmetrical shape in the cross direction X. Each first other member 11 is a member that is formed separately from the inner panel 3, the outer panel 2, and the interior member unit 5.

Each first other member 11 has a sheet-shaped base 11a which is fixed to the narrow portion 9 of the inner panel 3, and an arm 11b which extends from the base 11a toward the outer panel 2 and which is fixed to the outer panel 2.

The second other members 12 are, for example, provided in a pair on two sides in the cross direction X at the rear end of the outer circumferential portion 6, and connect the inner panel 3 and the outer panel 2. In the present embodiment, the pair of second other members 12 and 12 are formed in a symmetrical shape in the cross direction X. Each second other member 12 is a member that is formed separately from the inner panel 3, the outer panel 2, and the interior member unit 5. In the present embodiment, the pair of second other members 12 and 12 are arranged at positions that are advanced toward the front side of the vehicle and toward the inside in the cross direction X from the positions of the pair of first other members 11 and 11.

Each second other member 12 has a sheet-shaped base 12a which is fixed to the narrow portion 9 of the inner panel 3, a pair of arms 12b which extend from the base 12a toward the outer panel 2, and a pair of flanges 12c which are fixed to the pair of arms 12b and are fixed to the outer panel 2.

The third other member 13 is provided, for example, at the center in the cross direction X of the inner panel 3 at a front end of the outer circumferential portion 6, and connects the inner panel 3 and the outer panel 2. In the present embodiment, the third other member 13 is a base member to which a U-shaped striker (not illustrated) for fixing the hood is attached. The third other member 13 is a member that is formed separately from the inner panel 3, the outer panel 2, and the interior member unit 5.

The third other member 13 has a plurality of leg portions 13a which are fixed to the front portion 10 of the inner panel 3, a sheet-shaped base 13b which is fixed to an upper end of each leg portion 13a, and a sheet-shaped striker base 13c that protrudes from the base 13b toward the inner side of the vehicle (downward). The upper surface of the base 13b is fixed to the outer panel 2.

Next, a configuration of the interior member unit 5 is described.

The interior member unit 5 is configured so as to increase the surface rigidity of the outer panel 2 by joining the inner panel 3 and the outer panel 2. In particular, the interior member unit 5 is provided in order to increase the strength of the narrow portion 9 which is a particularly narrow location between the inner panel 3 and the outer panel 2 of the automobile panel 1. Therefore, the interior member unit 5 is arranged in the space S between the inner panel 3 and the outer panel 2, and in the present embodiment is arranged in the narrow portion 9. In the present embodiment, the interior member unit 5 joins each of the flanges 24 of the units 21 to 23 and the undersurface 2b of the outer panel 2. In the present embodiment, the interior member unit 5 is an integrally formed product, and is formed by subjecting a single steel sheet to press forming.

Note that, the interior member unit 5 including interior members 30 to be described later and the like may be made of synthetic resin such as fiber-reinforced plastic, or may be made of a composite material that uses both a steel sheet and fiber-reinforced plastic. Further, the interior member unit 5 may be made of an aluminum alloy at a location other than a location that is welded to the inner panel 3 or the outer panel 2. In such a case, the interior member unit 5 may be made using at least one of a steel sheet and synthetic resin, in addition to the aluminum alloy.

The interior member unit 5 has a plurality of interior members 30 (31 to 39), and a connecting member 50 that connects the plurality of interior members 30 to each other. In the present embodiment, the interior members 31 to 39 are referred to generically as "interior members 30". Note that, the connecting member 50 may be omitted, and in such a case the interior members 31 to 39 are arranged as separate members to each other.

In the present embodiment, each portion of the interior member unit 5 is formed using one sheet-shaped portion (one layer), and is formed in a simple shape that does not have a configuration in which a sheet is folded up two times or more (folded into two layers or more). That is, in the present embodiment, in the interior member 30, there is no location where the interior member 30 has been folded up two or more times. By providing the interior member 30 as a single-sheet member in this way, the sheet thickness is small, and the outer panel 2 can be stiffened at a narrow place between the inner panel 3 and the outer panel 2. In particular, in a case where the inner panel 3, the outer panel 2, and the interior member 30 are each constituted by a steel sheet, the interior member 30 can be connected to at least one of the inner panel 3 and the outer panel 2 by welding.

Each interior member 30 is a sheet-shaped member that is a beam-shaped member. That is, in contrast to the first other member 11, the second other member 12, and the third other member 13 which are each columnar members, the respective interior members 30 are beam-shaped members that are elongated in a first direction D1 to be described later.

In the present embodiment, the sheet thickness at each part in one interior member 30 is constant. In the present embodiment, as described in the foregoing, each interior member 30 is formed by subjecting a steel sheet to press forming, and is a lightweight steel sheet which is made extremely thin and has a thickness of 0.5 mm or less (for example, about 0.30 to 0.45 mm). Note that, in a case where the interior member 30 is an aluminum alloy sheet, the thickness of the interior member 30 is 0.5 to 0.8 mm.

Each interior member 30 is an elongated member that extends in the first direction D1 along the undersurface 2b of the outer panel 2. In the present embodiment, the first direction D1 is a direction that is approximately orthogonal to the height direction Z. The first direction D1 lies along the direction from an inner region (inner portion surrounded by the outer circumferential edge part 3a of the inner panel 3)

of the inner panel 3 as viewed in the sheet thickness direction toward the outer circumferential edge part 3a of the inner panel 3. Each interior member 30 includes a first end 41 which is one end in the first direction D1, and a second end 42 which is the other end in the first direction D1. In the present embodiment, each interior member 30 has a length of about 150 mm in the first direction D1, a length of about 25 mm in a second direction D2 that is orthogonal to the first direction D1 as viewed in the sheet thickness direction, and a thickness of about 3 mm. Note that, the terms "first direction D1" and "second direction D2" each refer to a direction as viewed in the sheet thickness direction of the outer panel 2. In each interior member 30, the first direction D1 is the longitudinal direction of the interior member 30, and the second direction D2 is the short-length direction of the interior member 30.

Each interior member 30 has a base plate 43, and a bead 44 that is formed on the base plate 43. Note that, although a configuration in which the bead 44 is formed is mainly described in the present embodiment, a configuration in which the bead 44 is not formed may be adopted. A configuration may be adopted in which the bead 44 is not formed on the base plate 43, and the entire interior member 30 is flat.

The base plate 43 is a rectangular planar portion in which, as viewed in the sheet thickness direction, the first direction D1 is the longitudinal direction, and the second direction D2 that is orthogonal to the first direction D1 is the short-length direction. Note that, in some cases the base plate 43 may have a shape that is curved to an extent that matches a curved shape of the outer panel 2. One of the ends of the base plate 43 in the first direction D1 is the first end 41 of the interior member 30. The first end 41 is, for example, a region of approximately 10% of the overall length of the interior member 30 in the first direction D1. The first end 41 has a first connecting portion 45 that is connected to the inner panel 3.

In the interior member 30, the first connecting portion 45 is a portion that is connected to the inner panel 3. In the present embodiment, the first connecting portion 45 is joined (fixed) to the inner panel 3 by welding. In the present embodiment, the first connecting portion 45 is joined to the upper face 24a of a rear end in the longitudinal direction Y of the flange 24 of the respective units 20 of the inner panel 3. Thus, in the inner panel 3, at the flange 24 that is joined to the outer panel 2, the inner panel 3 and the first connecting portion 45 of the interior member 30 are connected. According to this configuration, the interior member 30 can be arranged in a narrow place between the inner panel 3 and the outer panel 2, and the space required to stiffen the outer panel 2 can be made thin. In the present embodiment, the first connecting portion 45 is connected to the inner panel 3 at a portion that is parallel to the outer panel 2. Note that, the first connecting portion 45 may be joined to the inner panel 3 using an adhesive such as a mastic sealer. Further, in the present embodiment, the joints 4 are provided in some of the interior members 30 and at some parts of the connecting member 50, and the interior member unit 5 and the outer panel 2 are joined by the joints 4.

The bead 44 that extends along the first direction D1 is formed from an intermediate portion of the base plate 43 in the first direction D1 to the second end 42. The bead 44 is provided in order to increase the bending rigidity (section modulus) of the interior members 30. In the present embodiment, one bead 44 is formed in each interior member 30. Since it is preferable for the interior member 30 to be lightweight, there is a limit with respect to making the length (linear length) of the interior member 30 long in a cross section orthogonal to the first direction D1. On the premise that the length (linear length) of the interior member 30 in the aforementioned cross section is constant, a geometrical moment of inertia with respect to the aforementioned cross section in a case where a single tall bead is provided will be greater than a geometrical moment of inertia with respect to the aforementioned cross section in a case where a plurality of short beads are provided. By this means, the bending rigidity of each interior member 30 can be increased more while suppressing an increase in weight, and the stiffening effect with respect to the outer panel 2 can be increased further. In the present embodiment, the bead 44 is formed at a location other than the first end 41 in the first direction D1. In the second direction D2 that is orthogonal to the first direction D1 as viewed in the sheet thickness direction, the bead 44 is arranged at an intermediate portion of the base plate 43. In the present embodiment, the bead 44 is formed up to the second end 42, and a concavity in the bead 44 is open to an end face on the second end 42 side. On the other hand, the bead 44 is not formed up to the first end 41, and the concave shape of the bead 44 is closed in the vicinity of an end on the first end 41 side. Note that, the concave shape of the bead 44 may be closed on both sides in the first direction D1 by forming the bead 44 only at an intermediate portion of the base plate 43 in the first direction D1. Further, the bead 44 may be formed so that the concavity in the bead 44 is open to an end face on one side or the other side in the second direction D2.

The dimensions of the bead 44 in the first direction D1, the second direction D2, and the sheet thickness direction (height direction Z) are appropriately set according to the bending rigidity required for the interior member 30. In the present embodiment, a first side face 43a that faces the outer panel 2, and a second side face 43b that faces in the opposite direction to the first side face 43a are provided in the base plate 43, and the bead 44 protrudes on the second side face 43b side. According to this configuration, the bead 44 is prevented from contacting the outer panel 2.

In the present embodiment, the second end 42 includes the other end of the base plate 43 and one end of the bead 44 in the first direction D1. The second end 42 is, for example, a region that is approximately 10% of the overall length of the interior member 30 in the first direction D1. The second end 42 and the first end 41 are aligned in the first direction D1.

In the present embodiment, at a position which is separated from the first end 41 along the first direction D1, the interior member 30 has a second connecting portion 46 that is connected to the outer panel 2. In the present embodiment, the second connecting portion 46 is formed in the base plate 43. In the present embodiment, the second connecting portion 46 is arranged on the first side face 43a of the base plate 43 at an intermediate portion of the base plate 43 in the first direction D1 and at the second end 42. The second connecting portion 46 is a portion that is joined to an undersurface 2b of the outer panel 2 using a joining material 47 such as a mastic sealer, and is a portion that is in contact with the joining material 47. In the present embodiment, the second connecting portions 46 are intermittently arranged at a plurality of locations (in the present embodiment, three locations) along the first direction D1. Note that, the second connecting portion 46 may extend continuously along the first direction D1.

In the present embodiment, the second connecting portions 46 are arranged at both ends of the base plate 43 in the second direction D2, and the second connecting portions 46 are provided at a total of six locations. Note that, it suffices that the number of second connecting portions 46 in one interior member 30 is one or more, and the specific number of second connecting portions 46 is not limited. By the second connecting portion 46 and the first connecting portion 45 being arranged separately from each other in the first direction D1, the interior member 30, as a beam-shaped member, joins the inner panel 3 and the outer panel 2 to each other at locations that are separated in the first direction D1. Note that, the second connecting portion 46 may be joined to the inner panel 3 by welding.

Figure 7D:
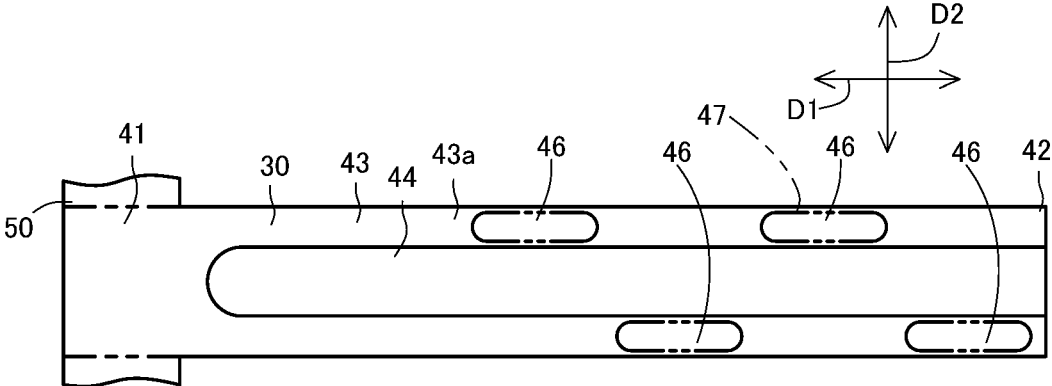
FIG. 7D is a view illustrating a modification of arrangement of second connecting portions.

In the present embodiment, the second connecting portions 46 on one end side in the second direction D2 and the second connecting portions 46 on the other end side in the second direction D2 in the interior member 30 are arranged symmetrically in the second direction D2, and their positions in the first direction D1 are aligned. However, this need not be the case. For example, as illustrated in FIG. 7D that shows a modification of the arrangement of the second connecting portions 46, the second connecting portions 46 (joining materials 47) may be provided in a staggered arrangement (a zigzag arrangement) as viewed in the sheet thickness direction. In FIG. 7D, in one interior member 30, the second connecting portions 46 (joining materials 47) are arranged so as not to be aligned in the second direction D2. In one interior member 30, a configuration in which the second connecting portion 46 is arranged on the one end side in the second direction D2 and next a configuration in which the second connecting portion 46 is arranged on the other end side in the second direction D2 are repeated as the position along the interior member 30 advances from the first end 41 side to the second end 42 side along the first direction D1. In a case where the number of the second connecting portions 46 on the one end side in the second direction D2 and the number of the second connecting portions 46 on the other end side in the second direction D2 are the same, the joining strength between the interior member 30 and the outer panel 2 can be made more equal at each portion on the second end 42 side of the interior member 30. By providing the second connecting portions 46 in a zigzag arrangement in this way, thermal strain caused by the joining material 47 arranged at the second connecting portions 46 can be reduced more during bake-hardening of the automobile panel 1.

The bending rigidity of the aforementioned interior member 30 depends on the thickness of the sheet material constituting the interior member 30, and the shape of the bead 44 in a cross section orthogonal to the first direction D1 (section modulus of the interior member 30).

In the present embodiment, the connecting member 50 is formed integrally with each interior member 30, and connects together the first ends 41 of adjacent interior members 30. In the present embodiment, the connecting member 50 forms an arcuate band-like portion together with the first end 41 of each interior member 30. In the present embodiment, the connecting member 50 forms an arcuate band-like portion by extending along the upper face 24a of the rear end of the flange 24 of each of the plurality of units 20. The connecting member 50 may be welded to the upper face 24a of the flange 24, or need not be joined to the upper face 24a.

In the present embodiment, the interior member unit 5 is arranged symmetrically in the cross direction X, and a plurality (nine) of the interior members 30 (31 to 39) are arranged along the cross direction X. Note that, it suffices that there is at least one interior member 30. In the present embodiment, the interior members 31 to 39 have the same shape but are different from each other with respect to at least one of the arrangement location and orientation thereof.

The interior members 31 and 39 arranged at both ends in the cross direction X in the interior member unit 5 are arranged in the vicinity of the front suspension tower 100 of the vehicle and stiffen the automobile panel 1 in the area around the suspension tower 100. The suspension tower 100 is one frame member of the vehicle, and for example is a columnar portion to which an upper end of a shock absorber equipped with a spring (not illustrated) that transmits the weight of the automobile body to a suspension arm is attached. A gap between the inner panel 3 of the automobile panel 1 and the suspension tower 100 is several centimeters or less, and the distance between the inner panel 3 and the high-strength suspension tower 100 is short. The interior members 31 and 39 are arranged at locations facing the suspension tower 100 in the height direction Z, or in the vicinity of the suspension tower 100. In this case, the term "vicinity" means that the interior members 31 and 39 and the upper end of the suspension tower 100 are adjacent in the sheet thickness direction (height direction Z) within, for example, a distance of about 10 cm or less.

The interior members 31 and 39 are the outermost interior members of the interior member unit 5 in the cross direction X, and the first direction D1 is defined so that, the interior members 31 and 39 extend in a manner intersecting with the direction (longitudinal direction Y) in which both ends in the cross direction X of the outer circumferential edge part 2a of the outer panel 2 extend as viewed in the sheet thickness direction.

The interior members 32 to 38 are arranged rearward of the respective units 20, and stiffen the rear part of the automobile panel 1. The interior members 32 to 38 are arranged in an intermediate portion of the interior member unit 5 in the cross direction X. With respect to the interior members 32 to 38, the first direction D1 is defined so that the interior members 32 to 38 extend in a manner intersecting with a direction (arcuate direction) in which a rear end in the longitudinal direction Y of the outer circumferential edge part 2a of the outer panel 2 extends as viewed in the sheet thickness direction. In the present embodiment, the first direction D1 of the interior members 32 to 38 extends along the longitudinal direction Y. The interior members 32 to 38 are arranged at a substantially equal pitch in the cross direction X. In the present embodiment, the interior members 32 to 38 are arranged between the pair of second other members 12 and 12, with the second ends 42 being arranged in the vicinity of the rear end of the outer circumferential edge part 3a of the inner panel 3.

In the present embodiment, the interior members 32 and 38 that are each adjacent to one second other member 12 pass between the pair of flanges 12c and the pair of arms 12b of the corresponding second other member 12, and are joined to the outer panel 2 at the second end 42. According to this configuration, the interior members 32 and 38 are arranged in a state in which a portion that is advanced to the second end 42 side from the first end 41 overlaps with second other member 12 as viewed in the sheet thickness direction.

The interior members 33 to 36 are arranged in a state in which a midway portion as a portion that is advanced to the second end 42 side from the first end 41 overlaps with the protruding portion 8 of the inner panel 3 as viewed in the sheet thickness direction.

Further, preferably, the first connecting portion 45 of the interior member 30 is adjacent to an end of the joint 4 that joins the inner panel 3 and the outer panel 2. In this case, the term "adjacent" means the first connecting portion 45 and the end of the joint 4 are aligned with an interval of not more than several centimeters (including zero millimeters) therebetween. For example, the first connecting portions 45 of the interior members 31 and 39 are adjacent to one end 4*a* of the joint 4 of the corresponding units 21 and 23, respectively. According to this arrangement, the first connecting portion 45 is arranged in the vicinity of the end of the joint 4, and as a result, the support rigidity of the outer panel 2 is prevented from suddenly changing at the end of the joint 4, and thus the dent resistance of the outer panel 2 around the one end 4*a* of the joint 4 can be increased. Dent resistance is an index of the difficulty of producing permanent strain which remains after the relevant part is strongly pressed (an index representing the difficulty of forming a dent flaw). For example, when the outer panel 2 is pressed down strongly, a dent flaw will easily be formed if the dent resistance is low. Further, if the dent resistance is low, when the outer panel 2 is hit with a pebble or the like, a dent flaw will be easily formed.

As described above, according to the present embodiment, for example, the interior member 30 is arranged in the narrow portion 9. The interior member 30 is an elongated member extending in the first direction D1, in which the first connecting portion 45 of the first end 41 is connected to the inner panel 3, and the second connecting portion 46 is connected to the outer panel 2 at a position that is separated from the position of the first end 41. According to this configuration, the inner panel 3 and the outer panel 2 can be joined by the thin interior member 30. Furthermore, the interior member 30 is joined to the inner panel 3 and the outer panel 2 at positions that are separated from each other in the first direction D1. With such a configuration, sufficient surface rigidity can be secured by the interior member 30 even in the narrow portion 9, that is, even at a location where the space S between the inner panel 3 and the outer panel 2 is narrow and a columnar member having high rigidity cannot be arranged. Further, since the surface rigidity of the outer panel 2 can be secured by the interior member 30, the panels 2 and 3 can be formed of thin and lightweight members. As described above, in the automobile panel 1, sufficient surface rigidity can be secured in the outer panel 2 at even a location where the space S between the inner panel 3 and the outer panel 2 is narrow, while also achieving a thin sheet thickness and a reduction in weight in the panels 2 and 3.

Further, according to the present embodiment, the interior member 30 is a sheet-shaped member. According to this configuration, the interior member 30 can be made thin. Hence, the interior member 30 can be arranged in the space S between the inner panel 3 and the outer panel 2 in the narrow portion 9. By this means, around the narrow portion 9, the effect of stiffening the outer panel 2 achieved by the interior member 30 can be further enhanced.

Furthermore, according to the present embodiment, the interior member 30 has the bead 44 that is formed along the first direction D1. According to this configuration, since the bending rigidity of the interior member 30 can be markedly increased, the strength by which the inner panel 3 and the outer panel 2 are stiffened can be further increased. Furthermore, when the bead 44 is used, the stiffening effect of the interior member 30 can be sufficiently exhibited while also forming the bead 44 in a manner so that the thickness of the interior member 30 does not become excessively large.

Further, according to the present embodiment, by arranging the interior members 32 and 38 in narrow locations around the second other members 12 and 12, the surface rigidity of the outer panel 2 at the narrow locations can be further increased.

Further, according to the present embodiment, the interior members 33 to 37 are each arranged in a state in which a portion that is advanced to the second end 42 side from the first end 41 overlaps with the protruding portion 8 of the inner panel 3 as viewed in the sheet thickness direction. According to this configuration, even at the protruding portion 8 where a columnar member cannot be arranged between the inner panel 3 and the outer panel 2 because the fourth other member 14 is arranged there, the automobile panel 1 can be stiffened by the interior members 33 to 37.

Further, according to the present embodiment, the outer circumferential edge part 2*a* of the outer panel 2 is joined to the inner panel 3 by sandwiching the inner panel 3, and the first direction D1 of the respective interior members 31 to 39 intersects with the direction along the outer circumferential edge part 2*a* at the closest location to the relevant interior member 31 to 39. According to this configuration, the outer circumferential edge part 2*a* of the outer panel 2 is firmly joined to the inner panel 3 by hemming. The interior member 30 arranged in the vicinity of this joining location can co-operate with the outer circumferential edge part 2*a* to increase the surface rigidity of the automobile panel 1 over a wider range.

Further, according to the present embodiment, the automobile panel 1 is an automobile hood, and a plurality of the interior members 31 to 39 are aligned and arranged at the rear part of the automobile panel 1. According to this configuration, by co-operation between the plurality of interior members 31 to 39, the rigidity with respect to a load from the sheet thickness direction (height direction Z) at the rear part of the automobile panel 1 can be further increased. As a result, in the event of occurrence of a collision accident in which a pedestrian collides with the rear part of the automobile panel 1, it is possible to mitigate an impact which causes the pedestrian to be thrust upward from a member (for example, the suspension tower 100) inside the engine room by receiving the pedestrian in a wide area of the automobile panel 1.

Further, according to the present embodiment, the respective first ends 41 of the plurality of interior members 31 to 39 are connected to a common connecting member 50. According to this configuration, the plurality of interior members 31 to 39 can be handled as a single component. Hence, the workload required to attach the interior members 31 to 39 to the inner panel 3 and the outer panel 2 can be reduced. Further, since the relative positions of the respective interior members 31 to 39 are fixed, the mounting positions of the interior members 31 to 39 with respect to the panels 2 and 3 can be made more accurate.

Further, according to the present embodiment, in the interior member unit 5, the interior members 31 and 39 in which the first direction D1 includes a directional component in the cross direction X are connected to the two ends of the connecting member 50. According to this configuration, the outer circumferential edge part 2*a* of the outer panel 2 and the interior members 31 and 39 co-operate so that the surface rigidity of the automobile panel 1 can be further increased.

An embodiment of the present invention has been described above. However, the present invention is not limited to the above embodiment. In the present invention, various changes are possible within the scope of the accompanying claims. Note that, hereunder, configurations that are different from the above embodiment and modifications are mainly described, and components that are the like as components in the above embodiment and modifications are denoted by the like reference symbols and a detailed description thereof is omitted.

In the embodiment described above, a configuration in which the respective interior members 31 to 39 have the same shape is described as an example. However, this need not be the case.

<First Modification>

Figure 8A:
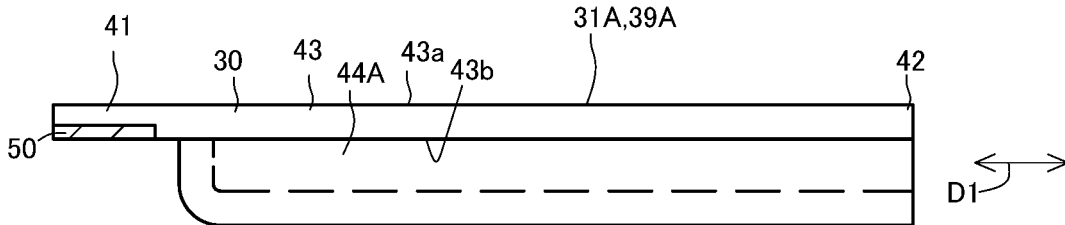
FIG. 8A and FIG. 8B are side views illustrating an interior member pertaining to a first modification.
Figure 8B:
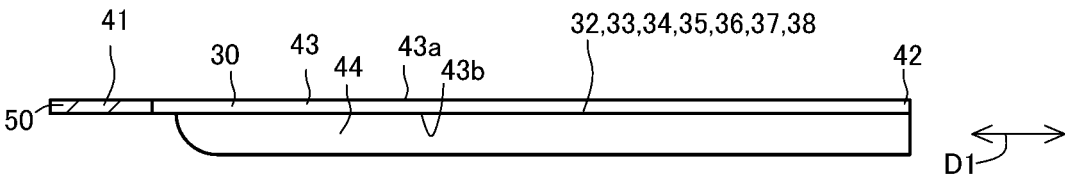

FIG. 8A and FIG. 8B are side views illustrating interior members 31A and 39A and the like pertaining to a first modification. As illustrated in FIG. 8A and FIG. 8B, the bending rigidity may be made to differ between the interior members 31A and 39A and the interior members 32 to 38. That is, a plurality of interior members 31A, 32 to 38, and 39A having different bending rigidities may be provided. In this first modification, as the interior members 30, the interior members 31A and 39A in which the bending rigidity is relatively high are provided as first interior members, and the interior members 32 to 38 in which the bending rigidity is relatively low are provided as second interior members. In this first modification, the plurality of interior members 31A, 32 to 38, and 39A having different bending rigidities are arranged according to the strength of the vehicle at locations advanced by a predetermined amount (for example, several millimeters to several tens of millimeters) toward the inner side (downward side) of the vehicle from the automobile panel 1 (outer panel 2 or inner panel 3).

The interior members 31A and 39A are members which are used instead of the interior members 31 and 39, and are arranged so as to overlap as viewed in the sheet thickness direction with the suspension tower 100 as a high strength region where the strength of the vehicle is relatively high at locations advanced by a predetermined amount (for example, several millimeters to several tens of millimeters) toward the inner side (downward side) of the vehicle from the inner panel 3 (or the outer panel 2). On the other hand, the interior members 32 to 38 are arranged so as to overlap as viewed in the sheet thickness direction with a low strength region 101 (cavity region) where the strength of the vehicle is relatively low at locations advanced by the same amount as the aforementioned predetermined amount toward the inner side of the vehicle from the inner panel 3 (or the outer panel 2). The sheet thickness of the interior members 31A and 39A may be made thicker than the sheet thickness of the interior members 32 to 38, or/and the height of a bead 44A may be made higher than the height of the bead 44.

According to this first modification, the surface rigidity of the automobile panel 1 can be increased by arranging the interior members 31A and 39A that have high bending rigidity with respect to the suspension tower 100 (high strength region) that is arranged on the inner side of the vehicle relative to the automobile panel 1. As a result, in the event of occurrence of a collision accident in which a pedestrian collides with the rear part of the automobile panel 1, it is possible to more reliably mitigate an impact which causes the pedestrian to be thrust upward from the suspension tower 100 or the like inside the engine room by receiving the pedestrian with the automobile panel 1. Further, at the low strength region 101, since the outer panel 2 can be stiffened with the lightweight interior members 32 to 38, the automobile panel 1 can be made lightweight.

<Second Modification>

Figure 9A:
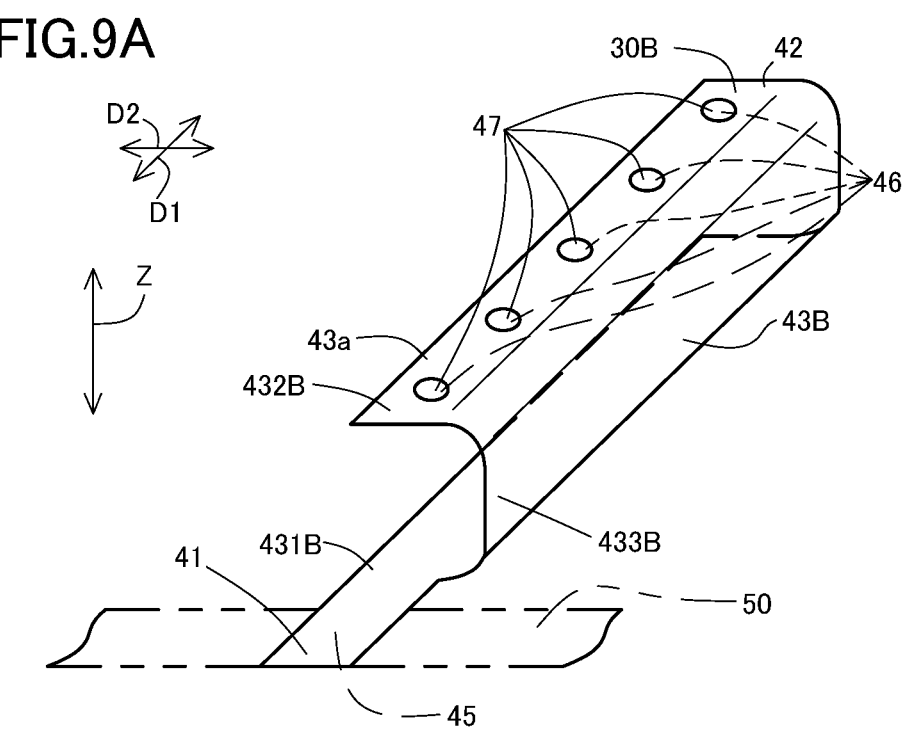
FIG. 9A is a schematic perspective view of an interior member pertaining to a second modification.

In the embodiment described above, a form in which the base plate 43 is planar has been described as an example. However, this need not be the case. FIG. 9A is a schematic perspective view of an interior member 30B pertaining to a second modification. As illustrated in FIG. 9A, each interior member 30B has a base plate 43B. Note that, although in this second modification a configuration in which a bead is not formed on the base plate 43B is mainly described, this need not be the case. A bead may be formed on the base plate 43B. In the case of forming a bead on the base plate 43B, a bead that is similar to the bead 44 that extends along the first direction D1 is formed on at least one of a first portion 431B, a second portion 432B, and a rising portion 433B, which are described later, of the base plate 43B.

The base plate 43B is a component which, as viewed from the first direction D1, is formed in a U-shape by subjecting a starting material that is a flat sheet to press forming, and as viewed in the sheet thickness direction, is a planar portion that is approximately rectangular in which the first direction D1 is taken as the longitudinal direction, and the second direction D2 that is orthogonal to the first direction D1 is taken as the short-length direction. Note that, in some cases the base plate 43B may have a shape that is curved to an extent that matches the curved shape of the outer panel 2.

The base plate 43B includes the first portion 431B including a first end 41, the rising portion 433B that rises to the outer panel 2 side from the first portion 431B, and the second portion 432B that extends from the rising portion 433B and whose position in the sheet thickness direction (height direction Z) of the outer panel 2 is different from the position of the first portion 431B.

One end of the base plate 43B in the first direction D1 is the first end 41 of the interior member 30B. In the present second modification, in this embodiment, the second end 42 includes the other end of the base plate 43B in the first direction D1. The second end 42 and the first end 41 are aligned in the first direction D1. The upper side face of the second portion 432B is the first side face 43a, and the second connecting portion 46 as a location where the joining material 47 is arranged is provided on the first side face 43a. The second connecting portion 46 is arranged at a position that is separated from the first end 41 along the first direction D1. Preferably, a plurality of the second connecting portions 46 are provided along the first direction D1. Further, preferably, on the first side face 43a, a plurality of the second connecting portions 46 are arranged in the vicinity of one end and the vicinity of the other end in the first direction D1, and are arranged at an equal pitch along the first direction D1. The rising portion 433B extends in the height direction Z, and connects together the first portion 431B and the second portion 432B so that the first portion 431B and the second portion 432B are aligned in the height direction Z.

According to the present second modification, a load from the outer panel 2 can be received while the interior member 30B including the rising portion 433B moderately deflects. As a result, the surface rigidity of the outer panel 2 can be increased.

Figure 9B:
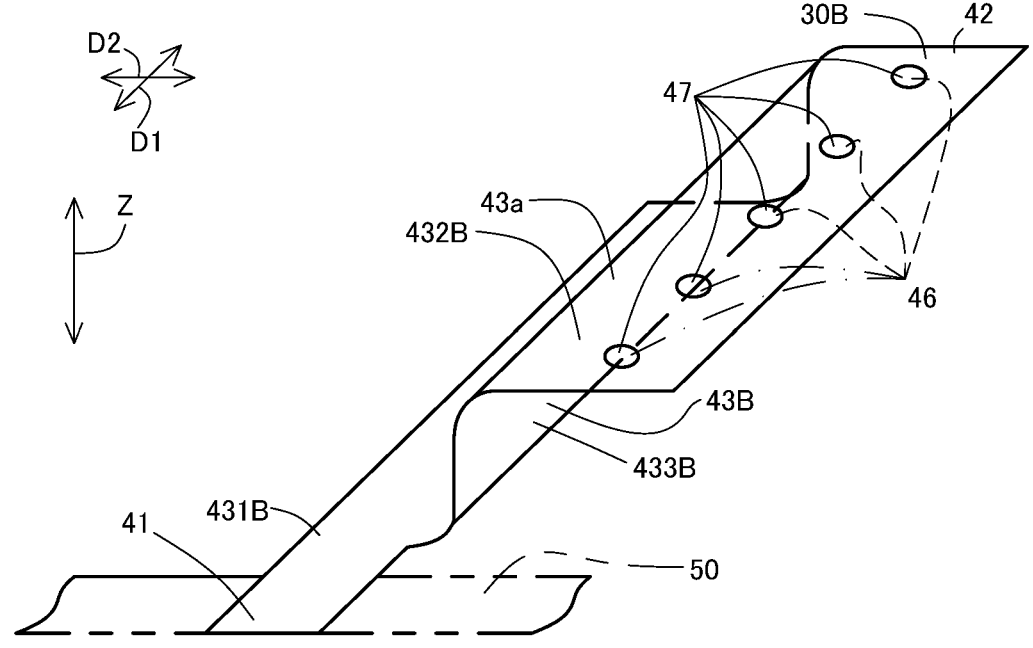
FIG. 9B is a view illustrating a modification of the second modification.

Note that, in the second modification, the first portion 431B and the second portion 432B of the base plate 43B are aligned in the height direction Z. However, this need not be the case. For example, as illustrated in FIG. 9B that shows a modification of the second modification, the first portion 431B and the second portion 432B may be arranged separated from each other so as not to overlap when viewed in the sheet thickness direction. In this case, the interior member 30B is formed in an S-shape or a Z-shape as viewed from the first direction D1.

<Third Modification>

Figure 10A:
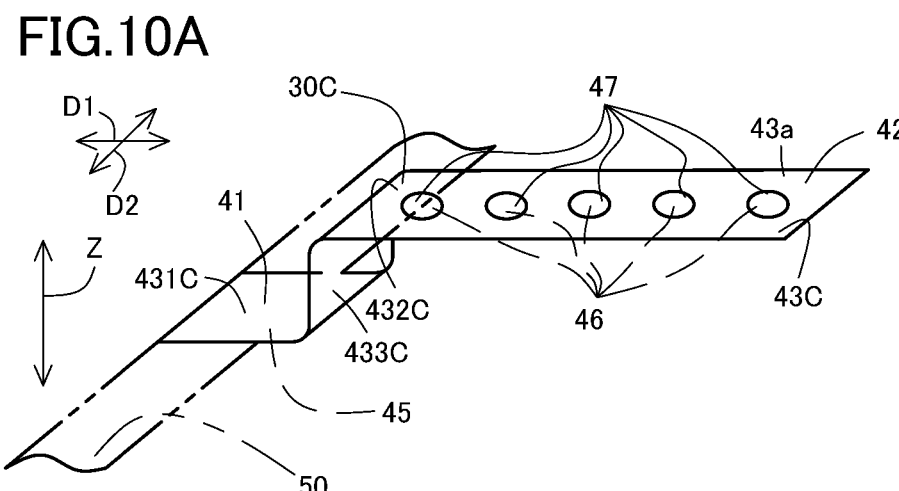
FIG. 10A is a schematic perspective view of an interior member pertaining to a third modification.

FIG. 10A is a schematic perspective view of an interior member 30C pertaining to a third modification. As illustrated in FIG. 10A, each interior member 30C has a base plate 43C. Note that, although in this third modification a configuration in which a bead is not formed on the base plate 43C is mainly described, this need not be the case. A bead may be formed on the base plate 43C. In the case of forming a bead on the base plate 43C, a bead that is similar to the bead 44 that extends along the first direction D1 is formed on at least one of a first portion 431C and a second portion 432C, which are described later, of the base plate 43C.

The base plate 43C is a component which, as viewed from the second direction D2, is formed in an S-shape by subjecting a starting material that is a flat sheet to press forming, and as viewed in the sheet thickness direction, is a planar portion that is approximately rectangular in which the first direction D1 is taken as the longitudinal direction, and the second direction D2 that is orthogonal to the first direction D1 is taken as the short-length direction. Note that, in some cases the base plate 43C may have a shape that is curved to an extent that matches the curved shape of the outer panel 2.

The base plate 43C includes the first portion 431C including a first end 41, a rising portion 433C that rises to the outer panel 2 side from the first portion 431C, and the second portion 432C that extends from the rising portion 433C and whose position in the sheet thickness direction (height direction Z) of the outer panel 2 is different from the position of the first portion 431C.

One end of the base plate 43C in the first direction D1 is the first end 41 of the interior member 30C. In the present third modification, in this embodiment, the second end 42 includes the other end of the base plate 43C in the first direction D1. The second end 42 and the first end 41 are aligned in the first direction D1. The upper side face of the second portion 432C is the first side face 43a, and the second connecting portion 46 as a location where the joining material 47 is arranged is provided on the first side face 43a. The second connecting portion 46 is arranged at a position that is separated from the first end 41 along the first direction D1. Preferably, a plurality of the second connecting portions 46 are provided along the first direction D1. Further, preferably, on the first side face 43a, a plurality of the second connecting portions 46 are arranged in the vicinity of one end and the vicinity of the other end in the first direction D1, and are arranged at an equal pitch along the first direction D1. The rising portion 433C extends in the height direction Z, and connects together the first portion 431C and the second portion 432C so that the first portion 431C and the second portion 432C are aligned in the first direction D1.

According to the present third modification, a load from the outer panel 2 can be received while the interior member 30C including the rising portion 433C moderately deflects. As a result, the surface rigidity of the outer panel 2 can be increased.

Figure 10B:
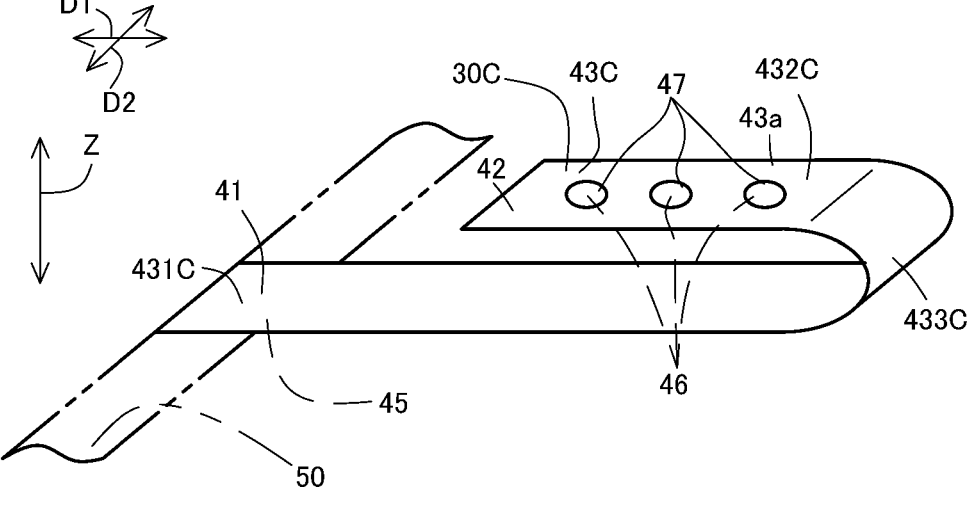
FIG. 10B is a view illustrating a modification of the third modification.

Note that, in the third modification, the first portion 431C and the second portion 432C of the base plate 43C do not face each other in the height direction Z. However, this need not be the case. For example, as illustrated in FIG. 10B that shows a modification of the third modification, the first portion 431C and the second portion 432C may be arranged so as to partially overlap as viewed in the sheet thickness direction and to be separated from each other in the height direction Z. In this case, the interior member 30C is formed in a U-shape as viewed from the second direction D2.

<Fourth Modification>

Figure 11:
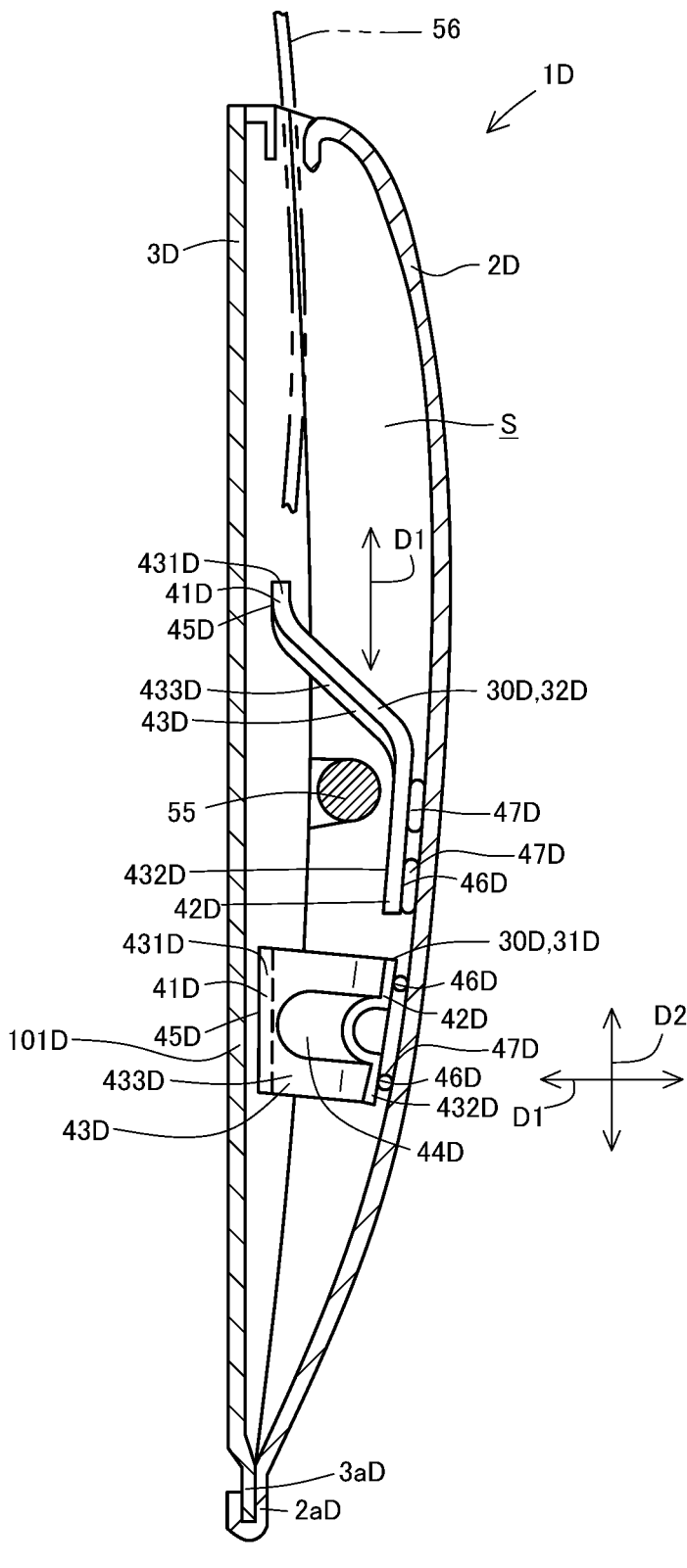
FIG. 11 is a schematic cross-sectional view illustrating a fourth modification.

In the embodiment and the first to third modifications described above, a form in which the automobile panel is an automobile hood is described as an example. However, this need not be the case. FIG. 11 is a schematic cross-sectional view illustrating a fourth modification. An automobile panel 1D illustrated in FIG. 11 is a door panel that is one part of a door for allowing an occupant to get into and out of a vehicle.

The automobile panel 1D has a sheet-shaped outer panel 2D located on the outer side of a vehicle, an inner panel 3D that is joined to the outer panel 2D and arranged on the inner side of the vehicle, and a side beam 55 and a plurality of interior members 30D which are arranged in a space S between the inner panel 3D and the outer panel 2D.

The materials and thicknesses of the outer panel 2D, the inner panel 3D, and the interior member 30D are the same as the materials and thicknesses of the corresponding outer panel 2, inner panel 3, and interior member 30 of the embodiment.

An outer circumferential edge part 2aD of the outer panel 2D is joined to the inner panel 3D by sandwiching an outer circumferential edge part 3aD of the inner panel 3D. More specifically, the outer circumferential edge part 2aD of the outer panel 2D includes a portion that is folded back by hemming, and the outer circumferential edge part 2aD firmly sandwiches the outer circumferential edge part 3aD of the inner panel 3D and is thereby joined to the outer circumferential edge part 3aD.

The outer panel 2D constitutes one part of the outer surface of the vehicle, and has a curved surface. The inner panel 3D is arranged so that a location other than the outer circumferential edge part 3a protrudes toward the inner side of the vehicle relative to the outer panel 2D. A door glass 56 is housed in the space S between the inner panel 3D and the outer panel 2D. The side beam 55 is a member formed of metal, synthetic resin, or a composite material of metal and synthetic resin or the like that is arranged along the vehicle length direction, and both ends thereof are fixed to the inner panel 3D.

Interior members 31D and 32D are provided as a plurality of interior members 30D. Note that, although in the present modification the interior members 31D and 32D are separate members, the interior members 31D and 32D may be a single member in which the interior members 31D and 32D are connected to each other by a connecting member. Each interior member 30D (31D, 32D) is a sheet-shaped member, and is a beam-shaped member elongated in the first direction D1.

Each interior member 30D is an elongated member extending in the first direction D1 along the outer panel 2D, and includes a first end 41D that is one end in the first direction D1, and a second end 42D that is the other end in the first direction D1.

The first end 41D has a first connecting portion 45D that is connected to the inner panel 3D. Further, each interior member 30D has a second connecting portion 46D that is connected to the outer panel 2D, at a position that is separated from the first end 41D along the first direction D1 (for example, a portion near to the second end 42D).

The interior members 31D and 32D have different bending rigidities to each other. The interior members 31D and 32D having these different bending rigidities are arranged according to the strength of the vehicle (the automobile panel 1) at locations advanced by a predetermined amount toward the inner side of the vehicle from the outer panel 2D.

In the fourth modification, the first interior member 31D whose bending rigidity is relatively high and the second interior member 32D whose bending rigidity is relatively low are provided.

The first interior member 31D is arranged so that, as viewed in the sheet thickness direction of the outer panel 2D, the first interior member 31D overlaps with a low strength region 101D where the strength of the vehicle is relatively low, at a location advanced by a predetermined amount (for example, about several tens of millimeters) toward the inner side of the vehicle from the outer panel 2D. The low strength region 101D is a location where the side beam 55 is not arranged as viewed in the sheet thickness direction. On the other hand, the second interior member 32D is arranged so that, as viewed in the sheet thickness direction of the outer panel 2D, the second interior member 32D overlaps with the side beam 55 that is a high strength region where the strength of the vehicle is relatively high, at a location advanced by the aforementioned predetermined amount toward the inner side of the vehicle from the outer panel 2D. In the second interior member 32D, for example, a second portion 432D, described later, of a base plate 43D overlaps with the side beam 55 as viewed in the sheet thickness direction.

Each interior member 30D (31D, 32D) has a base plate 43D.

The base plate 43D includes a first portion 431D including the first end 41D, a rising portion 433D that rises from the first portion 431D to the outer panel 2D side, and the second portion 432D that extends from the rising portion 433D and whose position in the sheet thickness direction of the outer panel 2D is different from the position of the first portion 41D.

Further, a bead 44D is formed on the base plate 43D of the first interior member 31D, but a bead is not provided on the second interior member 31D. By this means, the bending rigidity of the first interior member 31D is made greater than the bending rigidity of the second interior member 32D. In the interior member 31D, the bead 44D is formed, for example, from the rising portion 433D to the second end 42D of the second portion 432D. Note that, the bending rigidities of the interior members 31D and 32D may be made to differ from each other by making the sheet thickness of the first interior member 31D greater than the sheet thickness of the second interior member 32D.

The first connecting portion 45D that is connected to the inner panel 3D is provided in the first end 41D of each interior member 30D. In the second portion 432D of each interior member 30D, the second connecting portion 46D is arranged on a side face of the base plate 43D. The second connecting portion 46D is joined to the inner surface of the outer panel 2D using a joining material 47D such as a mastic sealer.

According to this fourth modification, sufficient surface rigidity can be secured by the interior member 30D even at a location where the space S between the inner panel 3D and the outer panel 2D is narrow and a columnar member having high rigidity cannot be arranged.

Further, by arranging the interior member 31D having high bending rigidity with respect to the low strength region 101D that is arranged on the inner side of the vehicle relative to the outer panel 2D, the rigidity of the automobile panel 1D at the low strength region 101D can be increased. As a result, in the event of occurrence of a collision accident in which an object such as a utility pole collides with the automobile panel 1D due to a lateral collision of the vehicle, it is possible to further reduce the amount by which the object enters the inner side of the vehicle by receiving the object with the interior member 31D. In addition, in the region in which the side beam 55 is arranged which is a high strength region, the outer panel 2D can be stiffened by the interior member 32D that is light in weight, and hence the automobile panel 1D can be made lightweight.

Further, in the embodiment and respective modifications described above, the interior member unit 5 and the inner panel 3 are formed as separate members. However, the interior members 31 to 39 and the inner panel 3 may be integrally formed.

INDUSTRIAL APPLICABILITY

The present invention can be widely applied as an automobile panel.

REFERENCE SIGNS LIST

1, 1D Automobile Panel
2, 2D Outer Panel
2a, 2aD Outer Circumferential Edge Part of Outer Panel
3, 3D Inner Panel
8 Protruding Portion
11, 12, 14 Other Member
30, 30D Interior Member
41, 41D First End
42, 42D Second End
43, 43B, 43C, 43D Base Plate
44, 44A, 44D Bead
45, 45D First Connecting Portion
46, 46D Second Connecting Portion
50 Connecting Member
55 Side beam (High Strength Region)
100 Suspension Tower (High Strength Region)
101, 101D Low Strength Region
431B, 431C, 431D First Portion
432B, 432C, 432D Second Portion
433B, 433C, 433D Rising Portion
D1 First Direction
S Space

The invention claimed is:

1. An automobile panel, comprising:
   a sheet-shaped outer panel located on an outer side of a vehicle, and
   an inner panel that is joined to the outer panel and is arranged on an inner side of the vehicle, and
   further comprising:
   an interior member arranged in a space between the inner panel and the outer panel,
   wherein:
   the interior member is an elongated member extending in a first direction along the outer panel, and includes a first end that is one end in the first direction and a second end that is another end in the first direction;
   the first end has a first connecting portion that is connected to the inner panel;
   the interior member has, at a position that is separated from the first end along the first direction, a second connecting portion that is connected to the outer panel;
   outer circumferential edge parts of the outer panel and outer circumferential edge parts of the inner panel are joined to each other over an entire circumference of the outer panel and the inner panel; and
   the entirety of the interior member is arranged in the space between the inner panel and the outer panel.

2. The automobile panel according to claim 1, wherein:
   the interior member is a sheet-shaped member.

3. The automobile panel according to claim 2, wherein:
   the interior member includes a planar base plate in which the first end and the second end are formed.

4. The automobile panel according to claim 2, wherein:
the interior member includes a base plate;
the base plate includes a first portion including the first end, a rising portion that rises from the first portion toward a side of the outer panel, and a second portion that extends from the rising portion and whose position in a sheet thickness direction of the outer panel is different from a position of the first portion; and
the second connecting portion is arranged in the second portion.

5. The automobile panel according to claim 2, wherein:
the interior member has a bead that is formed along the first direction.

6. The automobile panel according to claim 1, further comprising:
an other member formed separately from the interior member and arranged in the space between the inner panel and the outer panel,
wherein:
the interior member is arranged in a state in which a portion which is advanced from the first end toward a side of the second end overlaps with the other member as viewed in the sheet thickness direction of the outer panel.

7. The automobile panel according to claim 1, wherein:
the inner panel further comprises a protruding portion which protrudes further inward than a region that is joined to the outer panel, and separates from the outer panel,
wherein:
the interior member is arranged in a state in which the portion which is advanced from the first end toward the side of the second end overlaps with the protruding portion as viewed in the sheet thickness direction of the outer panel.

8. The automobile panel according to claim 1, wherein:
an outer circumferential edge part of the outer panel sandwiches the inner panel to be joined to the inner panel, and
the first direction intersects with a direction along the outer circumferential edge part of the outer panel.

9. The automobile panel according to claim 1, wherein:
the automobile panel is an automobile hood, and
a plurality of the interior members are aligned at a rear part of the automobile hood.

10. The automobile panel according to claim 9, wherein:
the first end of each of the plurality of interior members is connected to a common connecting member.

11. The automobile panel according to claim 10, wherein:
the interior member in which a directional component in the first direction includes a directional component in a vehicle cross direction is connected to both ends of the connecting member.

12. The automobile panel according to claim 1, wherein:
a plurality of the interior members that have different bending rigidities are provided, and
the plurality of the interior members that have different bending rigidities are arranged according to a strength of the vehicle at locations advanced by a predetermined amount toward an inner side of the vehicle from the outer panel.

13. The automobile panel according to claim 12, wherein:
a first interior member whose bending rigidity is relatively high and a second interior member whose bending rigidity is relatively low are provided as the plurality of the interior members that have different bending rigidities,
the first interior member is arranged so that, as viewed in the sheet thickness direction of the outer panel, the first interior member overlaps with a high strength region where a strength of the vehicle is relatively high at the location advanced by the predetermined amount toward the inner side of the vehicle from the outer panel, and
the second interior member is arranged so that, as viewed in the sheet thickness direction of the outer panel, the second interior member overlaps with a low strength region where the strength of the vehicle is relatively low at the location advanced by the predetermined amount toward the inner side of the vehicle from the outer panel.

14. The automobile panel according to claim 1, wherein:
the inner panel includes: a flange which is arranged on an inner side of the inner panel with respect to an outer circumferential edge part of the inner panel, and which is arranged adjacent to the outer panel; an inclined wall that extends from the flange so as to separate from the outer panel; and a bottom portion that is continuous with the inclined wall and is separated from the flange, and
the first connecting portion is connected to the flange.

* * * * *